United States Patent
Horanieh

(10) Patent No.: US 7,065,365 B2
(45) Date of Patent: Jun. 20, 2006

(54) CODE TREE FRAGMENTATION IN CALL ADMISSION CONTROL

(75) Inventor: Moussa Horanieh, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/750,197

(22) Filed: Dec. 31, 2003

(65) Prior Publication Data

US 2005/0070295 A1    Mar. 31, 2005

Related U.S. Application Data

(60) Provisional application No. 60/507,876, filed on Sep. 30, 2003.

(51) Int. Cl.
*H04Q 7/20* (2006.01)
(52) U.S. Cl. ............ 455/450; 455/452.1; 455/509; 455/63.1; 455/67.13; 370/335; 370/320
(58) Field of Classification Search ............... 455/450, 455/452.1, 452.2, 509, 515–517, 63.1, 67.11, 455/67.13; 370/208, 309, 320, 335; 375/140
See application file for complete search history.

(56) References Cited

U.S. PATENT DOCUMENTS

| | | | | |
|---|---|---|---|---|
| 5,926,763 | A * | 7/1999 | Greene et al. | 455/450 |
| 6,163,524 | A * | 12/2000 | Magnusson et al. | 370/208 |
| 6,400,755 | B1 * | 6/2002 | Harris et al. | 375/140 |
| 6,552,996 | B1 * | 4/2003 | Kim et al. | 370/209 |
| 6,591,109 | B1 * | 7/2003 | Pan | 455/452.1 |
| 6,791,961 | B1 * | 9/2004 | Zeira et al. | 370/335 |
| 6,882,849 | B1 * | 4/2005 | Pan | 455/452.1 |
| 6,885,646 | B1 * | 4/2005 | Zhang | 455/450 |
| 2001/0036823 | A1 * | 11/2001 | Lieshout et al. | 455/517 |
| 2002/0094817 | A1 * | 7/2002 | Rune et al. | 455/450 |
| 2003/0099282 | A1 * | 5/2003 | Magnusson | 375/140 |
| 2003/0117980 | A1 * | 6/2003 | Kim et al. | 370/332 |
| 2004/0131008 | A1 * | 7/2004 | Zuniga et al. | 370/208 |
| 2004/0162081 | A1 * | 8/2004 | Lu | 455/452.1 |
| 2004/0190474 | A1 * | 9/2004 | Zhang | 370/333 |

OTHER PUBLICATIONS

Cheng et al., "OVSF Code Channel Assignment for IMT-2000," IEEE Vehicular Technobgy Conference Proceedings, 2000-spring Tokyo, May 2000, vol. 3, pp. 2188-2192.*

(Continued)

*Primary Examiner*—Joseph Feild
*Assistant Examiner*—Kamran Afshar
(74) *Attorney, Agent, or Firm*—Volpe and Koenig, P.C.

(57) ABSTRACT

The invention provides various embodiments for radio resource management. In one embodiment, resources are assigned to users in a slotted wireless communication system having candidate timeslots. An interference level is determined for each candidate timeslot. An amount of resources available for assignment in each candidate timeslot is determined. A measurement of fragmentation of codes in an orthogonal variable spreading factor (OVSF) tree in each candidate timeslot is determined. A Figure of Merit for each time slot is determined using the determined interference level, the amount of available resources and the code fragmentation in the OVSF tree for each candidate timeslot. The resources are assigned from the candidate timeslot having a best Figure of Merit.

6 Claims, 7 Drawing Sheets

OTHER PUBLICATIONS

Minn et al., "Dynamic Assignment of Orthogonal Variable-spreading-Factor Cotes in W-CDMAI" IEEE Selected Areas in Communications Journal, vol. 18, Issue 8, Aug. 2000, pp. 1429-1440.*

Chen et al., "A Novel Code-assignment Scheme for W-CDMA Systems," IEEE Vehicular Technology conference, vol. 2, Oct. 2001, pp. 1182-1186.*

* cited by examiner

CODE TREE FRAGMENTATION IN CALL ADMISSION CONTROL

CROSS REFERENCE TO RELATED APPLICATION(S)

This application claims priority from U.S. provisional application No. 60/507,876 filed Sep. 30, 2003, which is incorporated by reference as if fully set forth.

FIELD OF INVENTION

The invention generally relates to wireless communication systems. In particular, the invention relates to radio resource management in such systems.

BACKGROUND

In code division multiple access (CDMA) communication systems, communications are sent over a shared frequency spectrum. To minimize cross interference between the transmitted signals, orthogonal codes are used. Communications transmitted with orthogonal codes through an ideal wireless channel experience no cross code correlation, although in practice due to multipath, the orthogonal nature of the codes may break down to some extent.

FIG. 1 is an illustration of a code tree for orthogonal variable spreading factors (OSVF). At the top of the tree is a code for a spreading factor of one. Codes in each row further down the tree have a spreading factor twice the factor of the row above that code. For the code tree of the time division duplex (TDD) mode of a third generation partnership project (3GPP) wideband code division multiple access (WCDMA) communication system, the maximum spreading factor as shown in FIG. 1 is sixteen (16). In other systems, the maximum spreading factor may be significantly larger, such as 256 or 512.

FIG. 1 is an illustration of an OVSF code tree having a maximum spreading factor of 16. The tree has one code of spreading factor 1, C1(1) of a value "1". Two codes, C2(2) having a value of "1,1" and C2(1) having a value of "1,–1", have a spreading factor of 2. Four codes, C4(4) to C4(1), have a spreading factor of 4. Eight codes, C8(8) to C8(1) have a spreading factor of 8 and sixteen codes, C16(16) to C16(1) have a spreading factor of 16.

The lines connecting the codes in the tree identify codes that are not orthogonal to each other in the tree. Codes connected by lines in either only an upward or downward direction are not orthogonal. To illustrate, code C16(16) is not orthogonal to code C2(2), since tracing a path from code C16(16) to code C2(2) can be done using four upward connecting lines. Conversely, codes C16(16) and C8(7) are orthogonal to each other. Tracing a path from C16(16) to C8(7) involves using two upward connecting lines and one downward connecting line.

To minimize interference between communications, it is desirable to only assign codes that are orthogonal to each other. It is also desirable to assign the codes in an optimal manner such that the maximum number of orthogonal codes are available for use. In an operating wireless communication system as codes are assigned and release, unoptimal code assignments may occur reducing the system's capacity.

FIG. 2A is an illustration of a fragmented OVSF code assignment. One problem with using OVSF codes is the efficient use of the codes. After the assigning and release of codes, codes C16(16), C16(13), C16(9) and C16(5) are still active, as show as being filled circles. To prevent the assignment of a code not orthogonal to these codes, all the codes above these codes are blocked from assignment, as shown by an "X". Accordingly, the use of C16(5) blocks C8(3), C4(2), C2(1) and C1(1). As shown in FIG. 2A, a total of ten codes are blocked, C1(1), C2(1), C2(2), C4(2), C4(3), C4(4), C8(3), C8(5), C8(7) and C8(8) are blocked. As a result of assigning four spreading factor (SF) sixteen codes, no SF 2 codes are available and only one SF4 code is available. Accordingly, services requiring an SF 2 code or multiple SF 4 codes can not be supported on this tree.

FIG. 2B illustrates an efficient (unfragmented) assignment of four SF 16 codes. Codes C16(16) to C16(13) are used. Only five codes are blocked as a result of this assignment, codes C1(1), C2(2), C4(4), C8(8) and C8(7). As a result, one SF 2 code is available and three SF 4 codes are available to support additional services. The assignment of FIG. 2B allows for greater latitude in code assignment than FIG. 2A.

Since the four codes assigned in FIG. 2A block more codes than necessary, this code assignment is considered fragment (the codes are fragmented over the tree). In FIG. 2B, a minimum number of codes are blocked and the code tree is considered unfragmented.

In call admission control, acceptance and the resources allocated to a new call is determined by the radio resource management device (RRM). In the Universal Mobile Terrestrial System (UMTS) W-CDMA TDD mode, the RRM assigns calls based on timeslot interference levels and fragmentation of resource units of a user's coded composite transport channel (CCTrCH) over timeslots. A resource unit is the use of one code in one timeslot at a spreading factor of sixteen. For lower spreading factors, more resource units are considered used. To illustrate for a spreading factor 8, two resource units are consider used and for a spreading factor of 1, sixteen resource units are considered used.

These assignments typically attempt to assign the new call codes to keep the timeslots unfragmented. However, as calls end and resources are released, some fragmented code trees result. Over time due to this fragmentation, calls may be unnecessarily blocked during call admission, as for having unavailable unblocked codes.

Accordingly, it is desirable to have alternate approaches to code assignment.

SUMMARY

The invention provides various embodiments for radio resource management. In one embodiment, resources are assigned to users in a slotted wireless communication system having candidate timeslots. An interference level is determined for each candidate timeslot. An amount of resources available for assignment in each candidate timeslot is determined. A measurement of fragmentation of codes in an orthogonal variable spreading factor (OVSF) tree in each candidate timeslot is determined. A Figure of Merit for each time slot is determined using the determined interference level, the amount of available resources and the code fragmentation in the OVSF tree for each candidate timeslot. The resources are assigned from the candidate timeslot having a best Figure of Merit.

BRIEF DESCRIPTION OF THE DRAWING(S)

DETAILED DESCRIPTION OF THE PREFERRED EMBODIMENT(S)

Hereafter, a wireless transmit/receive unit (WTRU) includes but is not limited to a user equipment, mobile station, fixed or mobile subscriber unit, pager, or any other type of device capable of operating in a wireless environment. Although the embodiments are described in conjunction with the UMTS TDD/CDMA system, the embodiments are applicable to any wireless system using OVSF codes.

Figure 3:
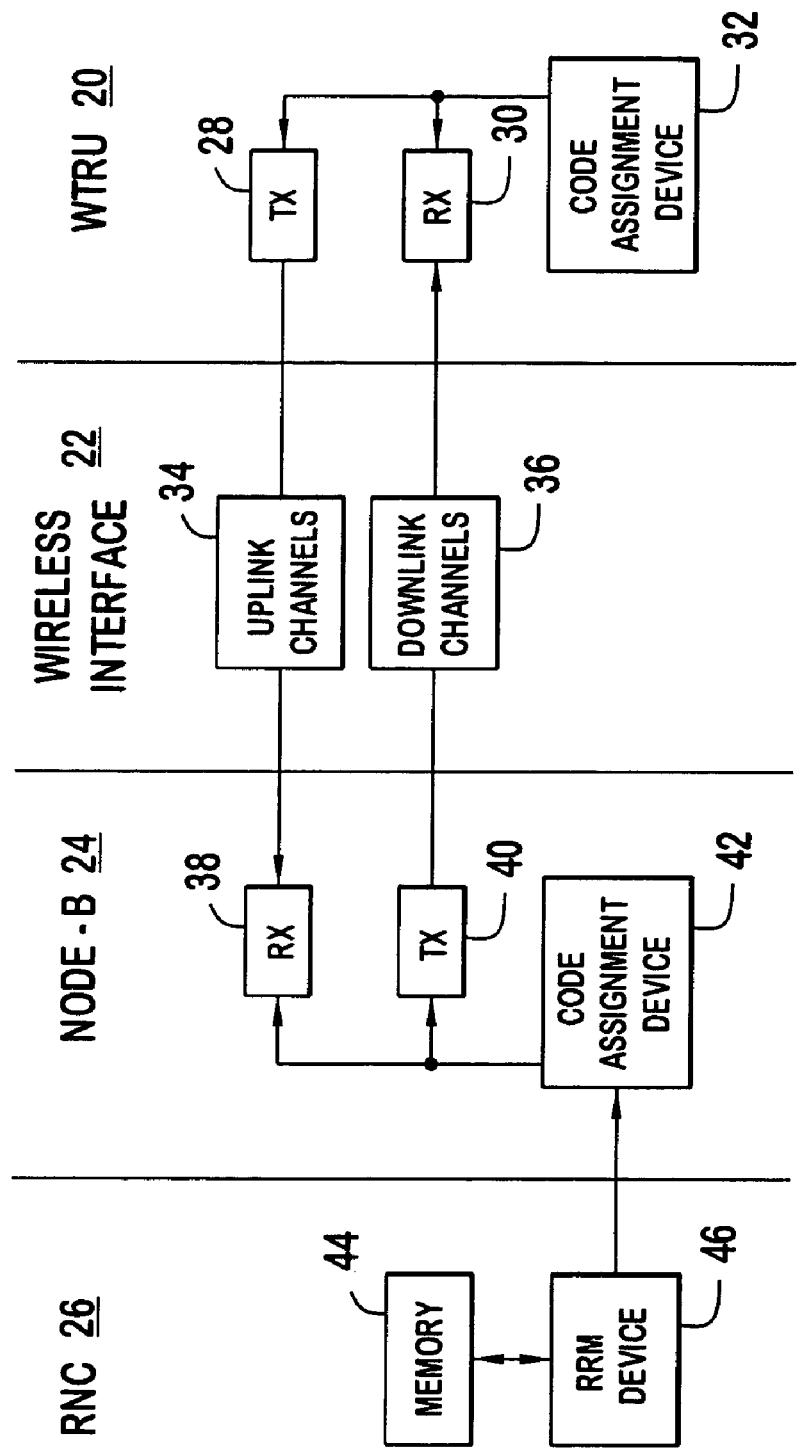
FIG. 3 is a simplified block diagram of a OVSF code assignment system.

FIG. 3 is a simplified diagram of a wireless communication system using OSVF code assignment. A radio network controller (RNC) 26 has a radio resource management (RRM) device 46 for use in assigning and releasing codes. The RRM device 46 has an associated memory for use in storing the code assignments and other information. A Node-B 24 has a code assignment device 42 which receives the resource allocation from the RRM device 46. The code assignment device 42 assigns codes to the uplink, downlink or both communications. A transmitter (TX) 40 uses the downlink code assignments to transfer communications through the downlink channel(s) 36 of the wireless interface 22. A receiver (RX) 38 uses the uplink code assignments to receive communications over the uplink channel(s) 34. A WTRU 20 has a code assignment device 32 for assigning uplink and downlink codes. The code assignments may be signaled from the RRM device 46 to the WTRU 20. The TX 28 uses the uplink code assignments to send uplink communications and the RX 30 uses the downlink code assignments to receive downlink communications.

Figure 4:
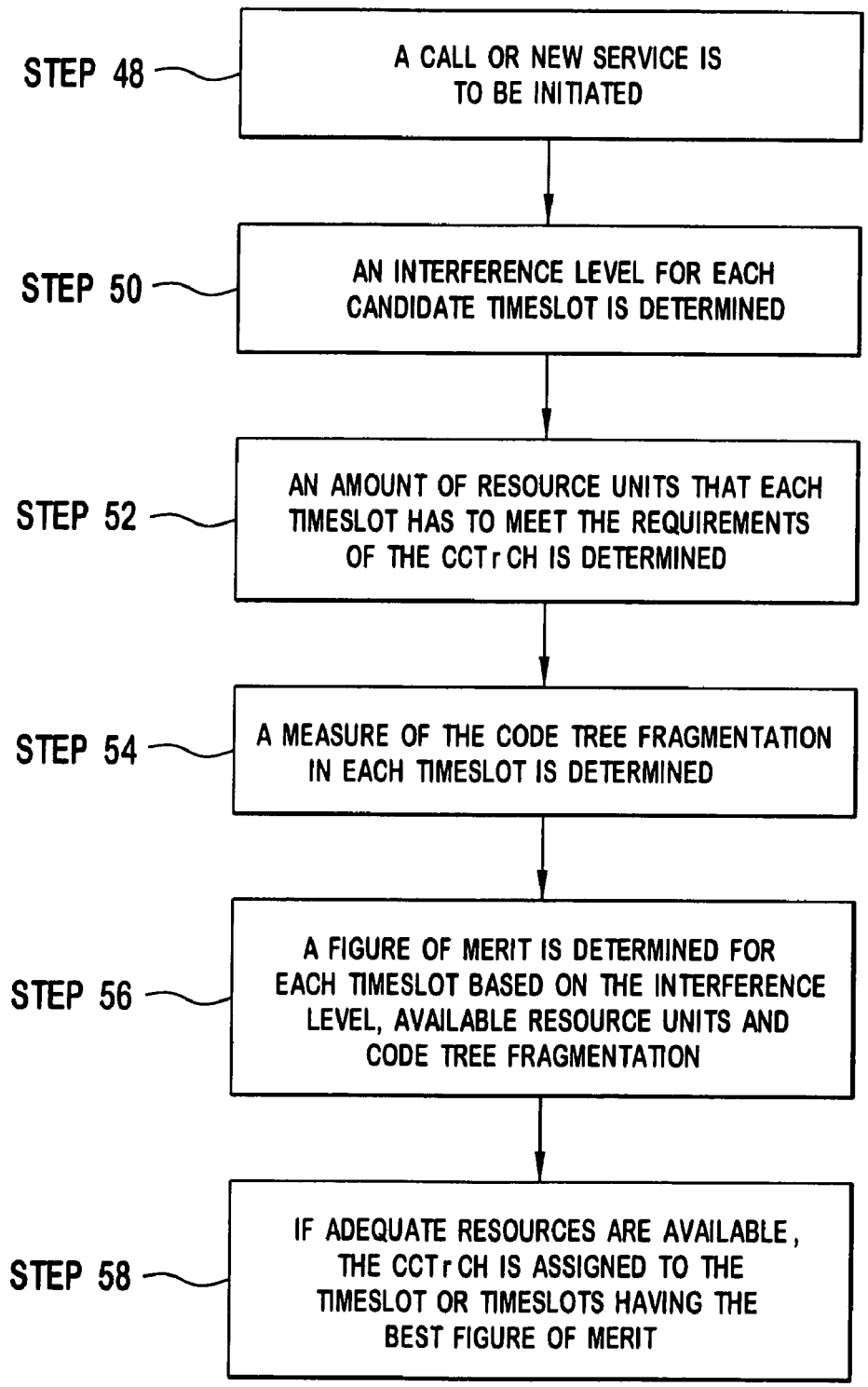
FIG. 4 is a flow diagram of call admission control using code tree fragmentation.

FIG. 4 is a flow diagram for call admission control for a time slotted communication system, such as the UMTS TDD/CDMA system, although the same principals can be applied to other resource management algorithms, such as escape, background interference reduction and radio access bearer release. These principals can also be applied to other wireless systems. To illustrate, carrier frequencies may be used instead of timeslots in frequency division duplex (FDD) systems.

A WTRU 20 desires to initiate a call or new service (step 48). The new call or service has an associated CCTrCH. An interference level, such as interference signal code power (ISCP), for each candidate timeslot is determined (step 50), and an amount of resource units that the timeslot has to meet the requirements of the CCTrCH is determined (step 52). To illustrate, if the CCTrCH requires four resource units and the timeslot has six resource units available, all of the CCTrCH requirements can be met by that timeslot. Typically, in a TDD system, the candidate timeslots for allocating uplink resources for call admission is all of the available uplink timeslots. For downlink resources, the candidate timeslots are all the available downlink timeslots.

A measure of the code tree fragmentation in the slot is also determined (step 54). A Figure of Merit is determined for each timeslot based on the interference level, available resource units of the timeslot and the code tree fragmentation (step 56). If adequate resources are available for the WTRU, the WTRU's CCTrCH is assigned to the timeslot or timeslots having the best Figure of Merit (step 58).

Equation 1 is one potential equation for the Figure of Merit for an $i^{th}$ timeslot.

$$F_i = -\alpha \cdot \Delta I_i + \beta \cdot f(C_i) + FDi \qquad \text{Equation 1}$$

$F_i$ is the Figure of Merit. $\alpha$ is a weighting parameter for the interference. $\beta$ is a weighting parameter for the amount of resource units. $f(C_i)$ is the amount of resource units that can be used by the WTRU's CCTrCH in the $i^{th}$ timeslot. $\Delta I_i$ is per Equation 2.

$$\Delta I_i = ISCP_i - ISCP_{min} \qquad \text{Equation 2}$$

$ISCP_i$ is the measured ISCP of the $i^{th}$ timeslot and $ISCP_{min}$ is the lowest ISCP of all of the candidate timeslots.

FDi is the code tree fragmentation of the $i^{th}$ timeslot. One measure of FDi is the number of unnecessarily blocked codes in a tree. The code tree fragmentation parameter, such as FDi, can be developed as to favor assigning CCTrCHs to fragmented timeslots or to assigning CCTrCHs to unfragmented or lesser fragmented timeslots. Based on simulations in typical situations, assigning CCTrCHs to fragmented timeslots tends to decrease the number of blocked calls as compared to unfragmented (lesser fragmented) or not using code tree fragmentation parameters. The number of satisfied calls as measured by quality of service (QoS), based on simulations, was the same for all three approaches. Accordingly, using a fragmentation parameter favoring assigning CCTrCHs to fragmented timeslots typically improves overall performance. However, in some situations, assigning CCTrCHs to unfragmented timeslots may be beneficial.

Figure 1:
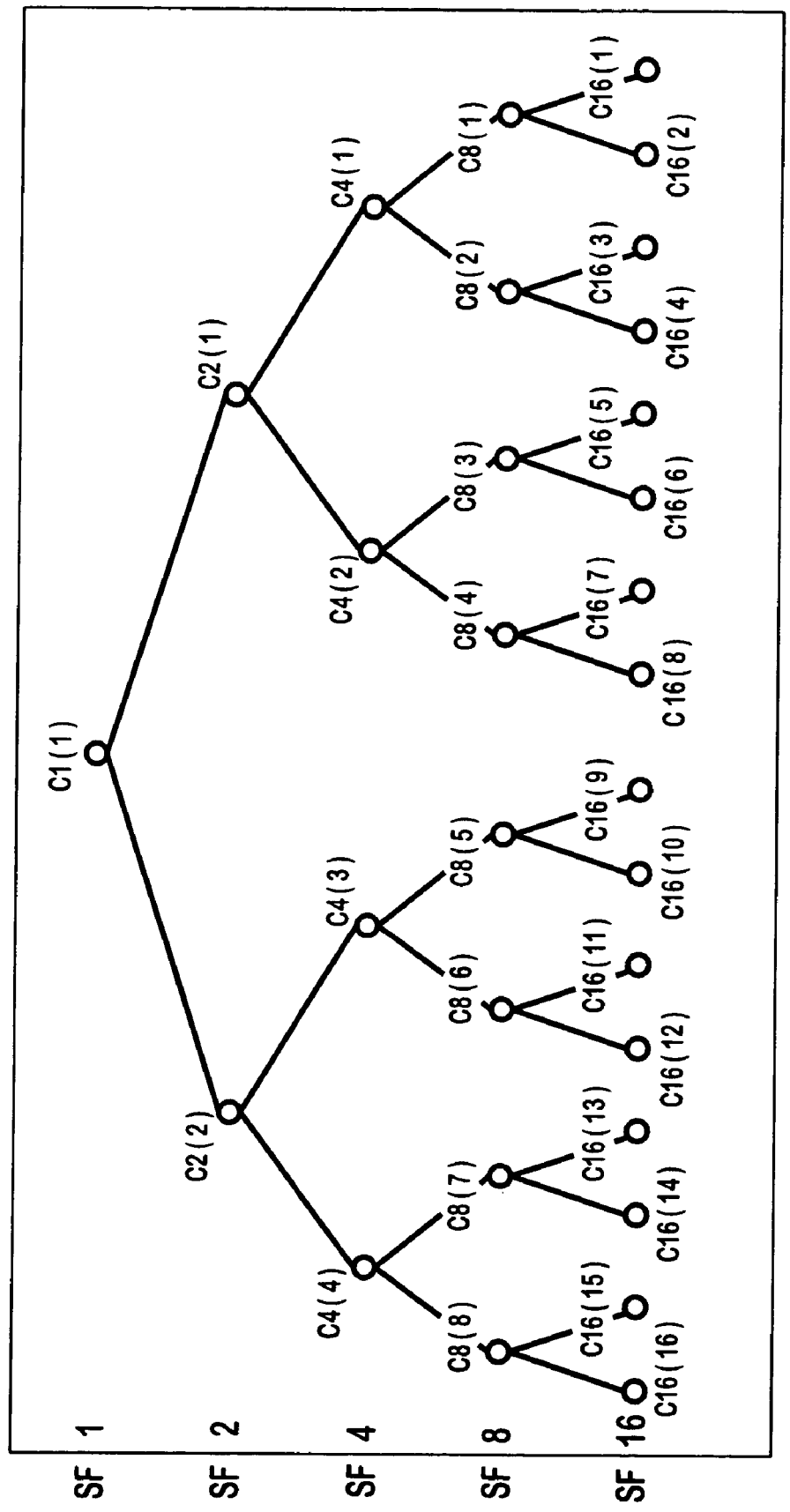
FIG. 1 is an illustration of a OVSF code tree.
Figure 2A:
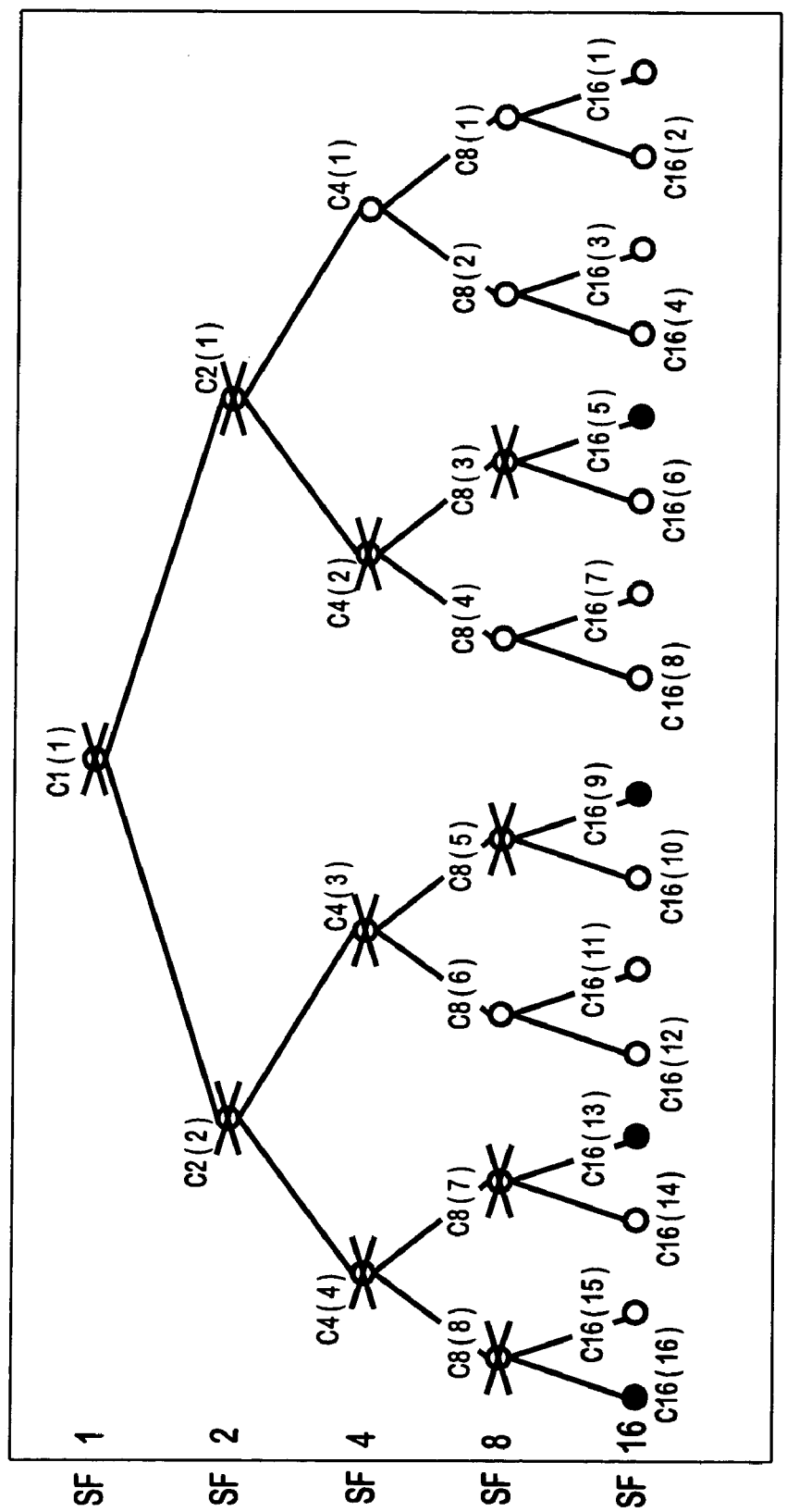
FIGS. 2A and 2B are illustrations of code allocations and the resulting blocked codes.
Figure 2B:
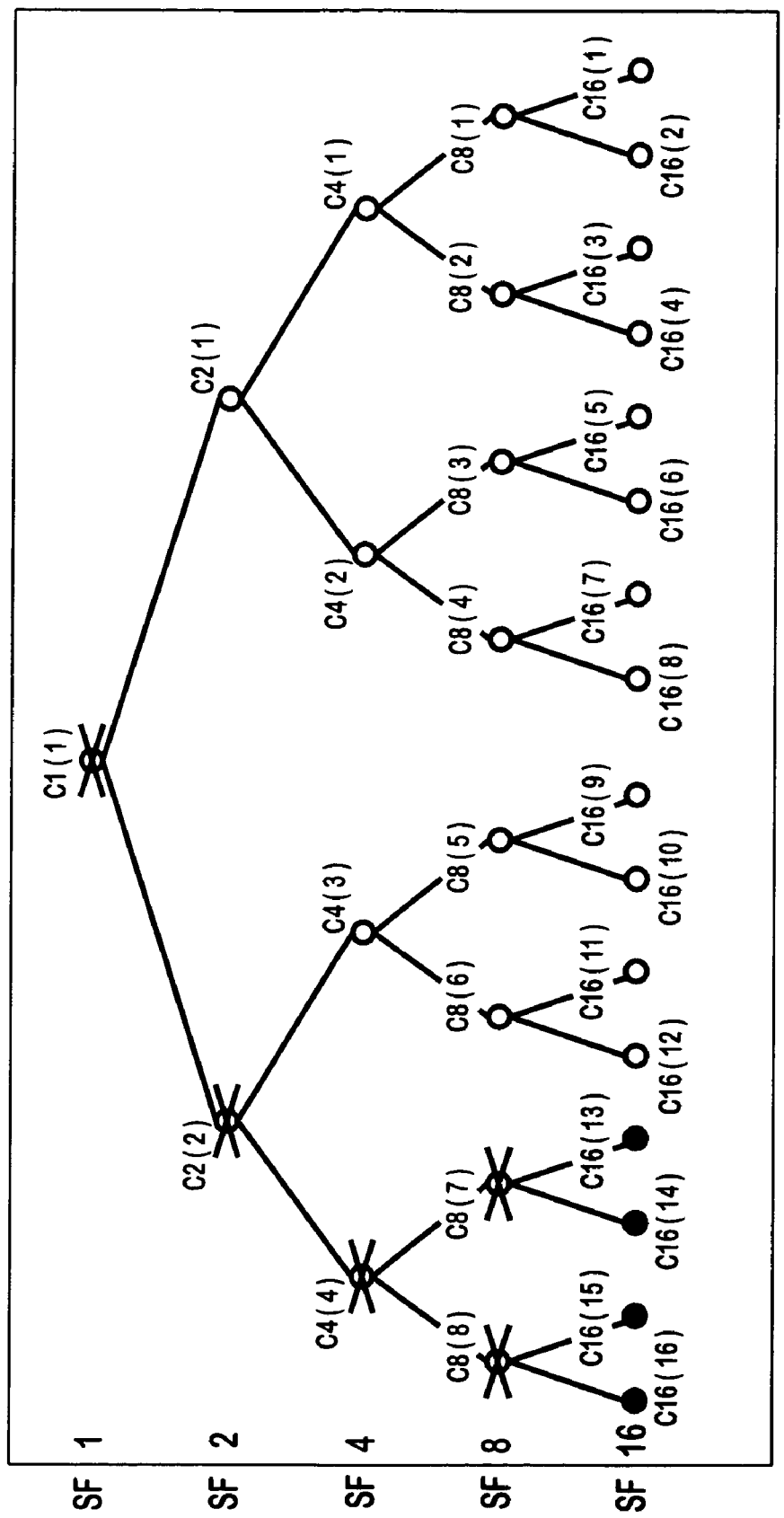
Figure 5:
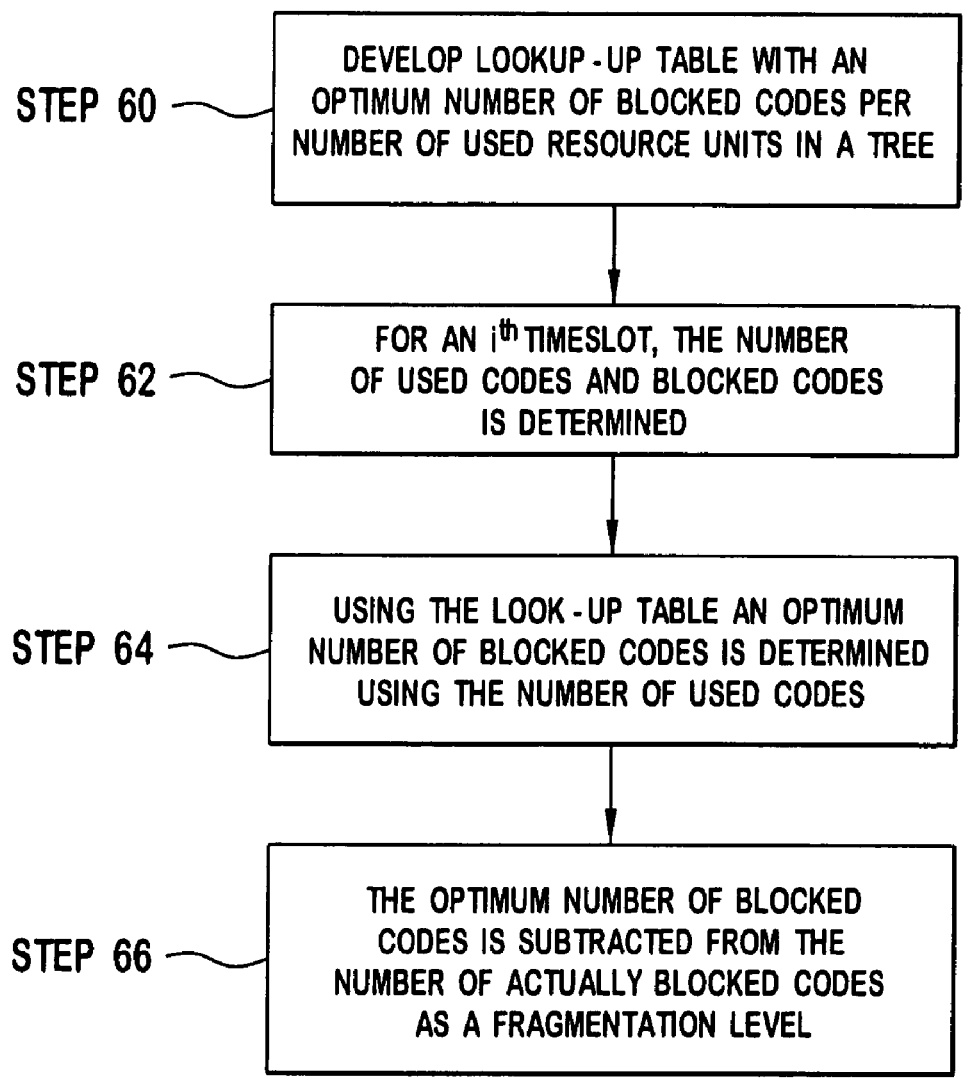
FIG. 5 is a flow diagram of a simplified approach for identifying fragmented timeslots.

Typically, as illustrated in FIGS. 2A and 2B, a node and branch type analysis is used to identify fragmented timeslots. FIG. 5 is a flow diagram for a simplified approach for identifying fragmented timeslots. Initially, a look-up table (LUT) is developed indicating an optimum number of blocked codes per number of used resource units in a tree, such as per Table 1 for a UMTS TDD/CDMA system (step 60).

TABLE 1

| Used Codes | Corresponding Blocked Codes |
| --- | --- |
| 0 | 0 |
| 1 | 4 |
| 2 | 3 |
| 3 | 4 |
| 4 | 2 |
| 5 | 4 |
| 6 | 3 |
| 7 | 4 |
| 8 | 1 |
| 9 | 4 |
| 10 | 3 |
| 11 | 4 |
| 12 | 2 |
| 13 | 4 |
| 14 | 3 |
| 15 | 4 |
| 16 | 0 |

For an $i^{th}$ timeslot, the number of used codes and blocked codes is determined (step 62). Typically, these values are stored in a database associated with the RRM device 46. Using the LUT, the optimum number of blocked codes is determined using the number of used codes (step 64). By subtracting the number of actually blocked codes from the optimum number, a fragmentation level, FL, is determined (step 66). The FL indicates the amount of fragmentation. To illustrate using Table 1, a timeslot having four blocked codes and five used codes is optimal, having an FL of 0. However, a timeslot having four blocked codes and eight used codes is sub-optimal, having a FL of 3. Accordingly, the procedure of FIG. 5 can be used to identify the amount of a timeslots fragmentation simply using a LUT and previously stored values.

Figure 6:
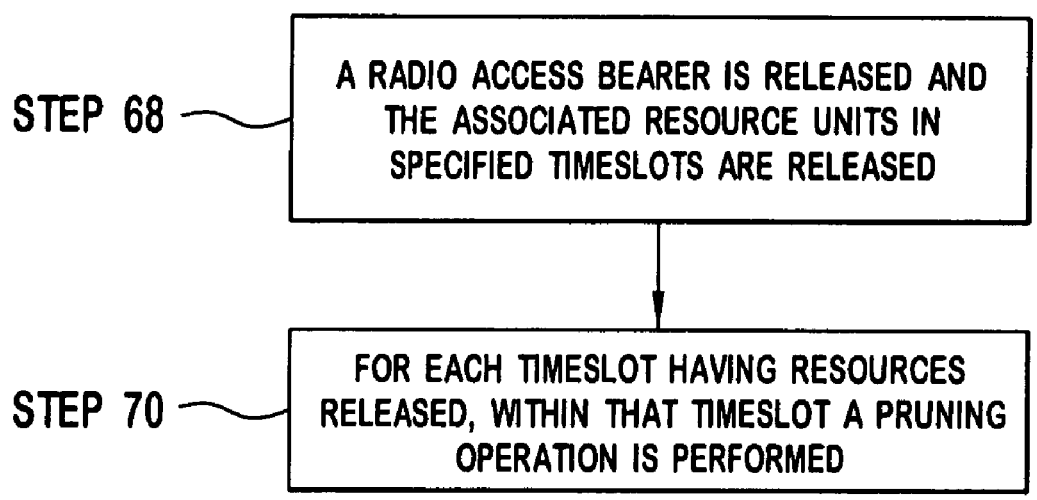
FIG. 6 is a flow diagram for simplified radio bearer release.

FIG. 6 is a flow diagram for radio resource management after radio access bearer release. A radio access bearer is released and the associated resource units in specified timeslots are released (step 68). For each timeslot having resources released, within that timeslot a code tree pruning operation is performed (step 70). In the code tree pruning operation, the used codes within a timeslot are reassigned to minimize the fragmentation. By only reassigning codes within a timeslot and not over multiple timeslots, reduces the messaging and time to complete the reassignment. Accordingly, the overhead associated with the pruning is reduced. The WTRUs 20 do not need to be reconfigured, since the code reallocations do not cross the timeslots.

Since code tree pruning requires overhead resources, it is desirable to minimize the amount of pruning. To minimize the amount of code tree pruning, code tree pruning can only be performed when a call is blocked at call admission control. When a call is blocked, a code pruning algorithm is run for each timeslot in isolation (intra timeslot) to free up resources for the call/service.

What is claimed is:

1. A method for assigning resources to users in a slotted wireless communication system having candidate timeslots, the method comprising:

an interference level is determined for each candidate timeslot;

an amount of resources available for assignment in each candidate timeslot is determined;

a measurement of fragmentation of codes in a orthogonal variable spreading factor (OVSF) tree in each candidate timeslot is determined;

a Figure of Merit for each time slot is determined using the determined interference level, the amount of available resources and the code fragmentation in the OVSF tree for each candidate timeslot; and the resources are assigned from the candidate timeslot having a best Figure of Merit, wherein the determining the Figure of Merit for an $i^{th}$ timeslot is per $$F_i = -\alpha \cdot \Delta I_i + \beta \cdot f(C_i) + FDi$$

where $F_i$ is the Figure of Merit for the $i^{th}$ timeslot, $\alpha$ and $\beta$ are weighting parameters, $\Delta I_i$ is a difference between an interference signal code power (ISCP) measurement of the $i^{th}$ timeslot and a minimum ISCP measurement of all the candidate timeslots, $f(C_i)$ is an amount of resource units that can be used by a coded composite transport channel (CCTrCH) of interest in the $i^{th}$ timeslot and FDi is a measure of OVSF code tree fragmentation in the $i^{th}$ timeslot.

2. The method of claim 1 wherein the resources are resource units in a time division duplex/code division multiple access communication system.

3. A radio network controller comprising:

a radio resource management device for assigning resources to users in a slotted wireless communication system having candidate timeslots, the radio resource management device determines an interference level for each candidate timeslot, determines an amount of resources available for assignment in each candidate timeslot, determines a measurement of fragmentation of codes in a orthogonal variable spreading factor (OVSF) tree in each candidate timeslot, determines a Figure of Merit for each time slot using the determined interference level, the amount of available resources and the code fragmentation in the OVSF tree for each candidate timeslot, and assigning the resources assigned from the candidate timeslot having a best Figure of Merit, wherein the determining the Figure of Merit for an $i^{th}$ timeslot is per $$F_i = -\alpha \cdot \Delta I_i + \beta \cdot f(C_i) + FDi$$

where $F_i$ is the Figure of Merit for the $i^{th}$ timeslot, $\alpha$ and $\beta$ are weighting parameters, $\Delta I_i$ is a difference between an interference signal code power (ISCP) measurement of the $i^{th}$ timeslot and a minimum ISCP measurement of all the candidate timeslots, $f(C_i)$ is an amount of resource units that can be used by a coded composite transport channel (CCTrCH) of interest in the $i^{th}$ timeslot and FDi is a measure of OVSF code tree fragmentation in the $i^{th}$ timeslot.

4. The radio network controller of claim 3 wherein the resources are resource units in a time division duplex/code division multiple access communication system.

5. A radio network controller for assigning resources to users in a slotted wireless communication system having candidate timeslots, the radio network controller comprising:

means for determining an interference level for each candidate timeslot;

means for determining an amount of resources available for assignment in each candidate timeslot;

means for determining a measurement of fragmentation of codes in a orthogonal variable spreading factor (OVSF) tree in each candidate timeslot;

means for determining a Figure of Merit for each time slot using the determined interference level, the amount of available resources and the code fragmentation in the OVSF tree for each candidate timeslot; and means for assigning the resources from the candidate timeslot having a best Figure of Merit, wherein the determining the Figure of Merit for an $i^{th}$ timeslot is per $$F_i = -\alpha \cdot \Delta I_i + \beta \cdot f(C_i) + FDi$$

where $F_i$ is the Figure of Merit for the $i^{th}$ timeslot, $\alpha$ and $\beta$ are weighting parameters, $\Delta I_i$ is a difference between an interference signal code power (ISCP) measurement of the $i^{th}$ timeslot and a minimum ISCP measurement of all the candidate timeslots, $f(C_i)$ is an amount of resource units that can be used by a coded composite transport channel (CCTrCH) of interest in the $i^{th}$ timeslot and FDi is a measure of OVSF code tree fragmentation in the $i^{th}$ timeslot.

6. The radio network controller of claim 5 wherein the resources are resource units in a time division duplex/code division multiple access communication system.

* * * * *

UNITED STATES PATENT AND TRADEMARK OFFICE
CERTIFICATE OF CORRECTION

PATENT NO. : 7,065,365 B2
APPLICATION NO. : 10/750197
DATED : June 20, 2006
INVENTOR(S) : Moussa Horanieh It is certified that error appears in the above-identified patent and that said Letters Patent is hereby corrected as shown below:

On the title page item (56), OTHER PUBLICATIONS, right column, page 1, line 2, before the word "Conference", delete "Technobgy" and insert therefor --Technology--.

On the title page item (56), OTHER PUBLICATIONS, left column, page 2, line 2, after the words "spreading-Factor", delete "Cotes in W-CDMAI" and insert therefor --Codes in W-CDMA--.

At column 1, line 28, after the word "factors", delete "(OSVF)" and insert therefor --(OVSF)--.

At column 1, line 61, before the word "unoptimal", delete "release" and insert therefor --released--.

At column 2, line 20, before the words "(the codes", delete "fragment" and insert therefor --fragmented--.

At column 2, line 63, before "OVSF", delete "a" and insert therefor --an--.

At column 2, line 66, before "OVSF", delete "a" and insert therefor --an--.

At column 3, line 19, before the word "code", delete "OSVF" and insert therefor --OVSF--.

At column 5, line 2, after the word "having", delete "a" and insert therefor --an--.

At column 5, line 3, after the word "of a", delete "timeslots" and insert therefor --timeslot's--.

At claim 1, column 5, line 34, after the words "codes in", delete "a" and insert therefor insert --an--.

UNITED STATES PATENT AND TRADEMARK OFFICE
CERTIFICATE OF CORRECTION

PATENT NO. : 7,065,365 B2
APPLICATION NO. : 10/750197
DATED : June 20, 2006
INVENTOR(S) : Moussa Horanieh It is certified that error appears in the above-identified patent and that said Letters Patent is hereby corrected as shown below:

At claim 5, column 6, line 38, after the words "codes in", delete "a" and insert therefor insert --an--.

Signed and Sealed this

Ninth Day of January, 2007

JON W. DUDAS
*Director of the United States Patent and Trademark Office*